United States Patent
Horng et al.

(10) Patent No.: US 6,819,021 B1
(45) Date of Patent: Nov. 16, 2004

(54) COMBINATION OF A BASE AND AN AXLE TUBE FOR A MOTOR

(75) Inventors: Alex Horng, Kaohsiung (TW);
Yin-Rong Horng, Kaohsiung (TW);
Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/401,876

(22) Filed: Mar. 31, 2003

(51) Int. Cl.⁷ .................................................. H02K 5/00
(52) U.S. Cl. ........................ 310/91; 310/90; 360/99.04
(58) Field of Search ............................... 310/67 R, 90, 310/254, 91, 217; 360/99.04, 99.08, 98.07

(56) References Cited

U.S. PATENT DOCUMENTS

| | | | | |
|---|---|---|---|---|
| 5,436,519 A | * | 7/1995 | Takahashi et al. | .......... 310/217 |
| 5,562,347 A | * | 10/1996 | Hsieh | .......... 384/215 |
| 5,610,462 A | * | 3/1997 | Takahashi | .......... 310/90 |
| 6,021,043 A | * | 2/2000 | Horng | .......... 361/695 |
| 6,072,261 A | * | 6/2000 | Lin | .......... 310/254 |
| 6,205,110 B1 | * | 3/2001 | Miyamoto et al. | .......... 369/266 |
| 6,400,053 B1 | * | 6/2002 | Horng | .......... 310/91 |
| 6,435,722 B1 | * | 8/2002 | Horng | .......... 384/279 |
| 6,453,722 B1 | * | 9/2002 | Liu et al. | .......... 73/9 |
| 6,501,617 B1 | * | 12/2002 | Harada et al. | .......... 360/99.08 |
| 6,617,736 B1 | * | 9/2003 | Horng et al. | .......... 310/91 |
| 2002/0047474 A1 | * | 4/2002 | Huang et al. | .......... 310/254 |
| 2002/0067087 A1 | * | 6/2002 | Yoshida et al. | .......... 310/67 R |
| 2002/0067088 A1 | * | 6/2002 | Yoshida et al. | .......... 310/67 R |
| 2002/0096953 A1 | * | 7/2002 | Shingai et al. | .......... 310/90 |
| 2002/0135247 A1 | * | 9/2002 | Liao | .......... 310/90 |
| 2002/0171302 A1 | * | 11/2002 | Takayanagi | .......... 310/90 |
| 2003/0062783 A1 | * | 4/2003 | Horng et al. | .......... 310/91 |
| 2003/0146668 A1 | * | 8/2003 | Sun et al. | .......... 310/90.5 |

* cited by examiner

Primary Examiner—Dang Le
Assistant Examiner—Heba Y M Elkassabgi
(74) Attorney, Agent, or Firm—Bacon & Thomas, PLLC (57) ABSTRACT

A combination of a base and an axle tube is provided for a motor. The base includes a tubular body and an axial hole through which the axle tube extends. A flange extends upward from a peripheral edge delimiting the axial hole. At least one positioning groove is defined in an inner periphery of the flange. The axle tube includes at least one protrusion on an outer periphery thereof for engaging with the positioning groove of the base. At least one resilient hook rod is formed in the tubular body of the axle tube and has a hook for securely retaining a stator around the axle tube and for securely retaining at least one bearing in the axle tube.

10 Claims, 14 Drawing Sheets

COMBINATION OF A BASE AND AN AXLE TUBE FOR A MOTOR

BACKGROUND OF THE INVENTION

1. Field of the Invention

The present invention relates to a combination of a base and an axle tube for a motor. In particular, the present invention relates to a combination of a base and an axle tube for a motor, wherein the base and the axle tube are engaged with each other through a positioning groove and a positioning protrusion.

2. Description of Related Art

Figure 1:
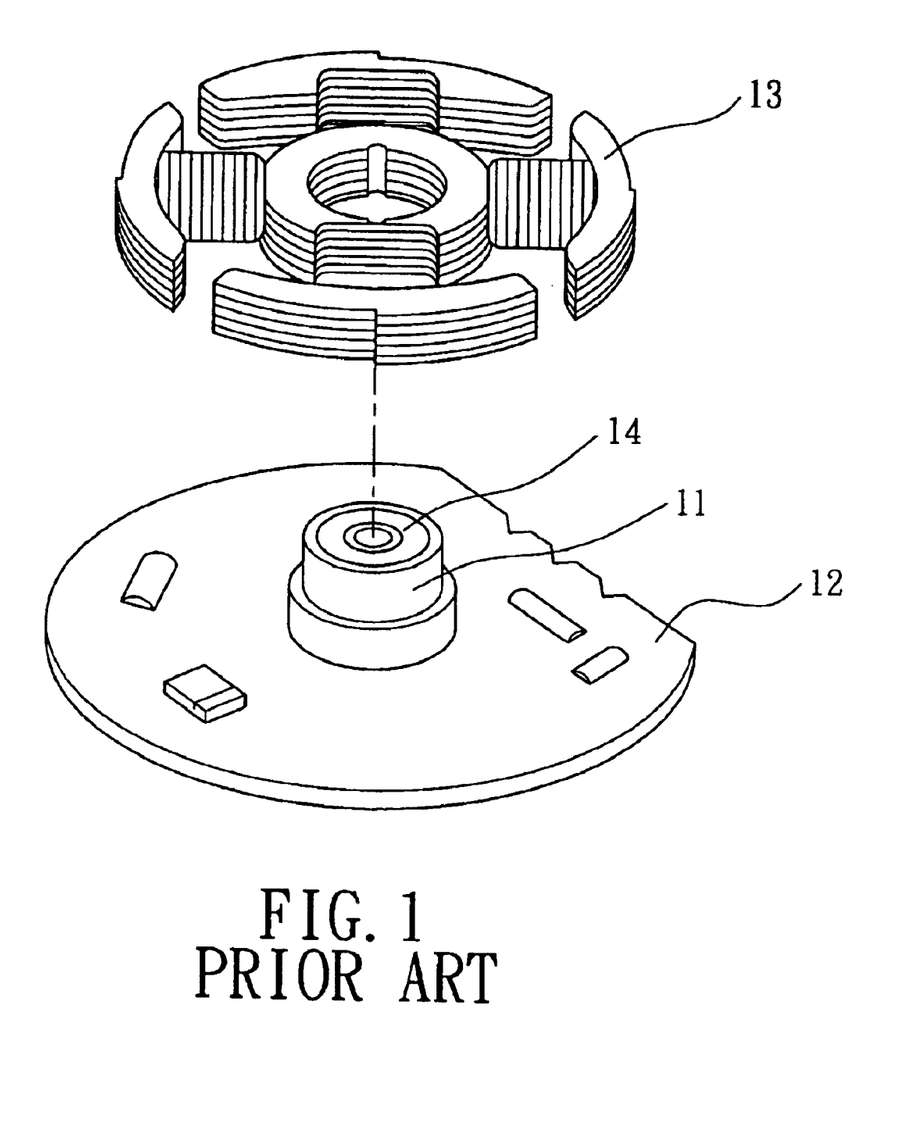
FIG. 1 is an exploded perspective view of a conventional combination of a base and an axle tube.

FIG. 1 of the drawings illustrates a conventional structure of a base and ax axle tube for a motor. Such a structure is disclosed in, e.g., Taiwan Utility Model Publication No. 343808 entitled "POSITIONING STRUCTURE FOR A STATOR AND SENSING ELEMENTS FOR A MINIATURE HEAT-DISSIPATING FAN". As illustrated in FIG. 1, an axle tube 11 is integrally formed on a base (not shown) of a motor and made of plastics. Further, the axle tube 11 has an outer periphery for tightly engaging with a circuit board 12 and a stator 13. A bearing 14 is mounted in the axle tube 11.

Figure 2:
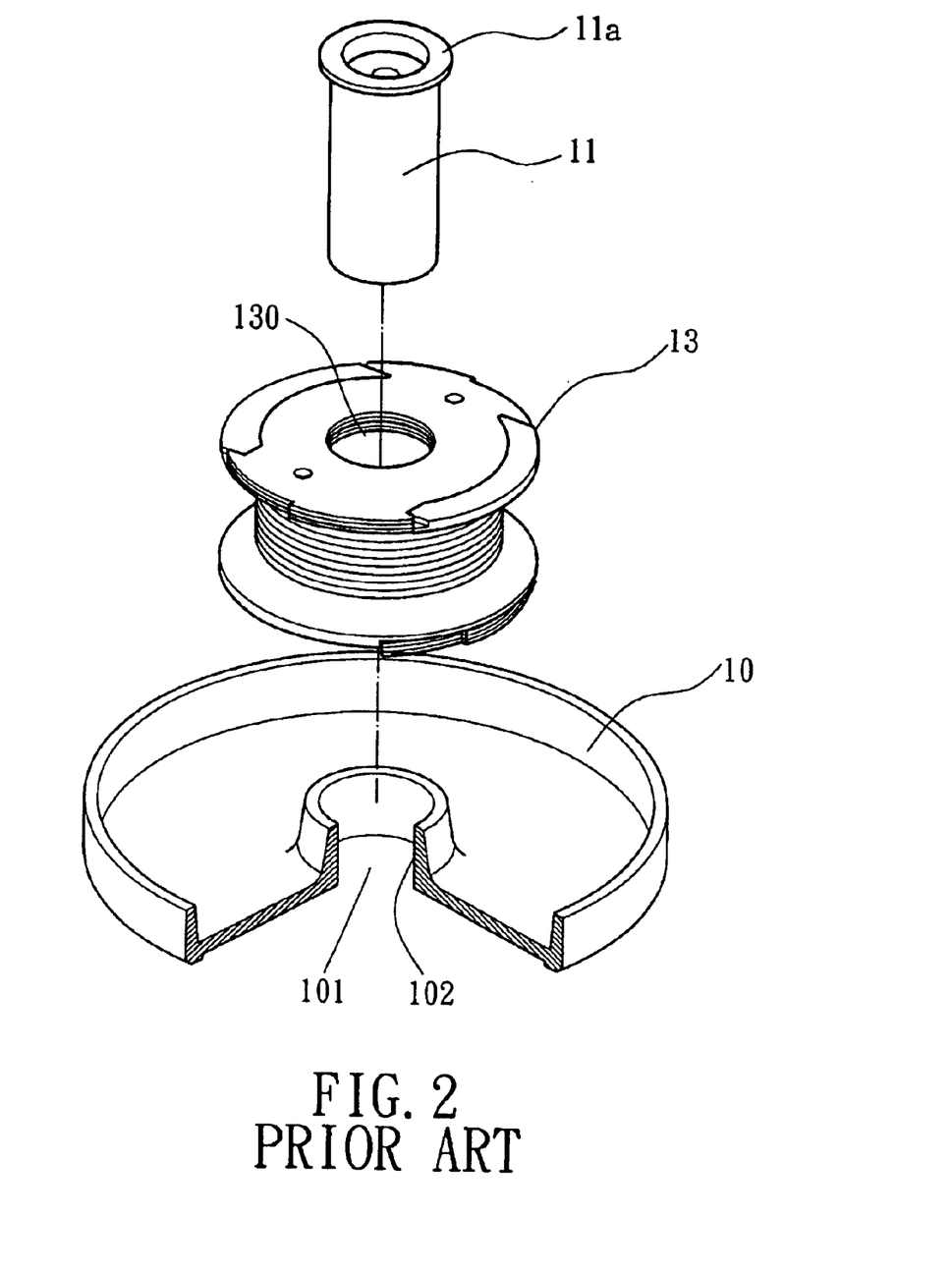
FIG. 2 is an exploded perspective view of another conventional combination of a base and an axle tube.

FIG. 2 of the drawings illustrates another conventional structure of a base and an axle tube for a motor. Such a structure is disclosed in, e.g., Taiwan Utility Model Publication No. 236471 entitled "STATOR STRUCTURE FOR A MINIATURE HEAT-DISSIPATING FAN". As illustrated in FIG. 2, the base 10 includes an axial hole 101 and a flange extending upward from a peripheral edge delimiting the axial hole 101. The axle tube 11 is preferably made of metal and includes a lip 11a on an upper end thereof. A lower portion of the axle tube 11 is tightly engaged with the flange 102 of the base 10, and an outer periphery of the axle tube 11 is tightly engaged in a central hole 130 of a stator 13. And the stator 13 is retained on the base 10 by the lip 11a of the axle tube 11.

Figure 3:
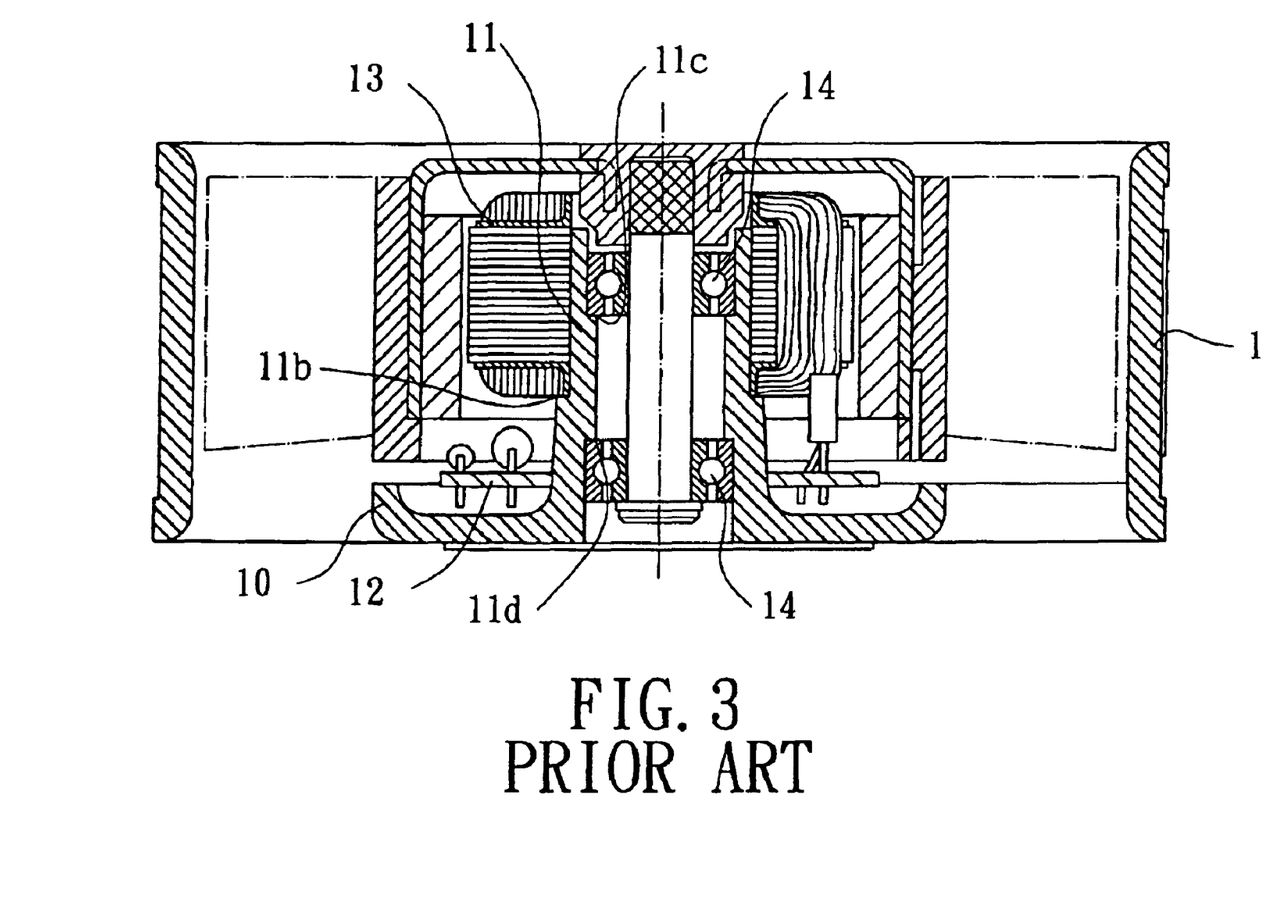
FIG. 3 is a sectional view of a conventional D.C. fan.

FIG. 3 of the drawings illustrates a miniature D.C. fan having a further conventional structure of a base and ax axle tube for a motor. Such a structure is disclosed in, e.g., U.S. Pat. No. 5,267,842. As illustrated in FIG. 3, the miniature D.C. fan includes a casing 1, a base 10, and an axle tube 11. The base 10 is made of plastics and supported by a plurality of ribs of the casing 1, and the axle tube 11 is integrally formed with the base 10. The axle tube 11 includes a plurality of shoulders 11b, 11c, and 11d for tightly engaging with a stator 13, a circuit board 12, and at least one bearing 14 (preferably ball bearing), respectively.

Although the structures shown in FIGS. 1 through 3 are simple and easy to assemble at a low cost, time-consuming lathing or drilling is, however, required for forming the inner periphery and the outer periphery of the axle tube 11 for accurately positioning and assembling with the circuit board 12, the stator 13, and the bearing 14. Further, the bearing 14 and/or the axle tube 11 are apt to deform when proceeding with the procedure for tightly engaging the bearing 14 in the axle tube 11. Further, the axle tube 11 may turn or move upward relative to the base 10, as the axle tube 11 is merely engaged with the base of the motor by means of tight fitting. Further, the base 10 and the axle tube 11 can only be used with the stator 13 of a single specification; namely, the base 10, the axle tube 11, and the housing 1 must be redesigned if the stator 13 is of another specification. As a result, when the motor using any one of the axle tubes 11 shown in FIGS. 1 through 3 turns, the rotational movement is not balanced and noise is generated. Further, the assembly and design for motors are less flexible. Further, the stator might be loosened, which leads to shortening of the life of the motor.

OBJECTS OF THE INVENTION

An object of the present invention is to provide a combination of a base and an axle tube for a motor, wherein the base and the axle tube are engaged with each other through a positioning groove and a positioning protrusion. The axle tube includes resilient hook rods for reliably assuring that a central axis of the stator is coaxial with a central axis of the bearing.

Another object of the present invention is to provide a combination of a base and an axle tube for a motor, wherein the axle tube can be quickly replaced for using with a bearing and a stator of different specifications.

SUMMARY OF THE INVENTION

To achieve the aforementioned objects, the present invention provides a combination of a base and an axle tube for a motor. The base includes a tubular body and an axial hole. A flange extends upward from a peripheral edge delimiting the axial hole and has an inner periphery. At least one positioning groove is defined in a lower portion of the inner periphery of the flange. The axle tube includes at least one protrusion on a lower portion of an outer periphery thereof. The axle tube is extended through the axial hole of the base, with the lower portion of the outer periphery of the axle tube being engaged with the lower portion of the inner periphery of the axial hole of the base and with the protrusion of the axle tube being engaged in the positioning groove of the base. At least one resilient hook rod is formed in the tubular body of the axle tube and has a hook for securely retaining a stator around the axle tube and for securely retaining at least one bearing in the axle tube.

Other objects, advantages and novel features of this invention will become more apparent from the following detailed description when taken in conjunction with the accompanying drawings.

DETAILED DESCRIPTION OF THE PREFERRED EMBODIMENTS

The present invention is now to be described hereinafter in detail, in which the same reference numerals are used for the same parts as those in the prior art.

Figure 4:
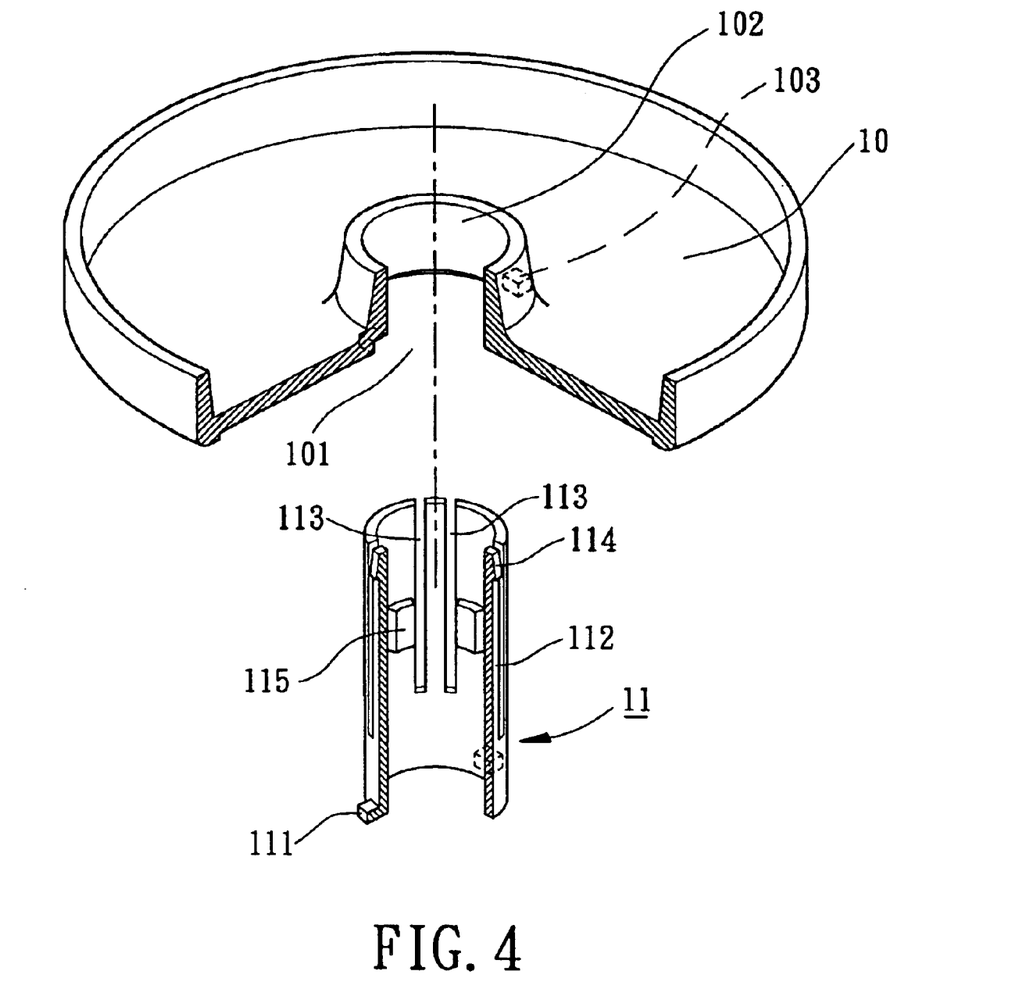
FIG. 4 is an exploded perspective view of a first embodiment of a combination of a base and an axle tube in accordance with the present invention.
Figure 5:
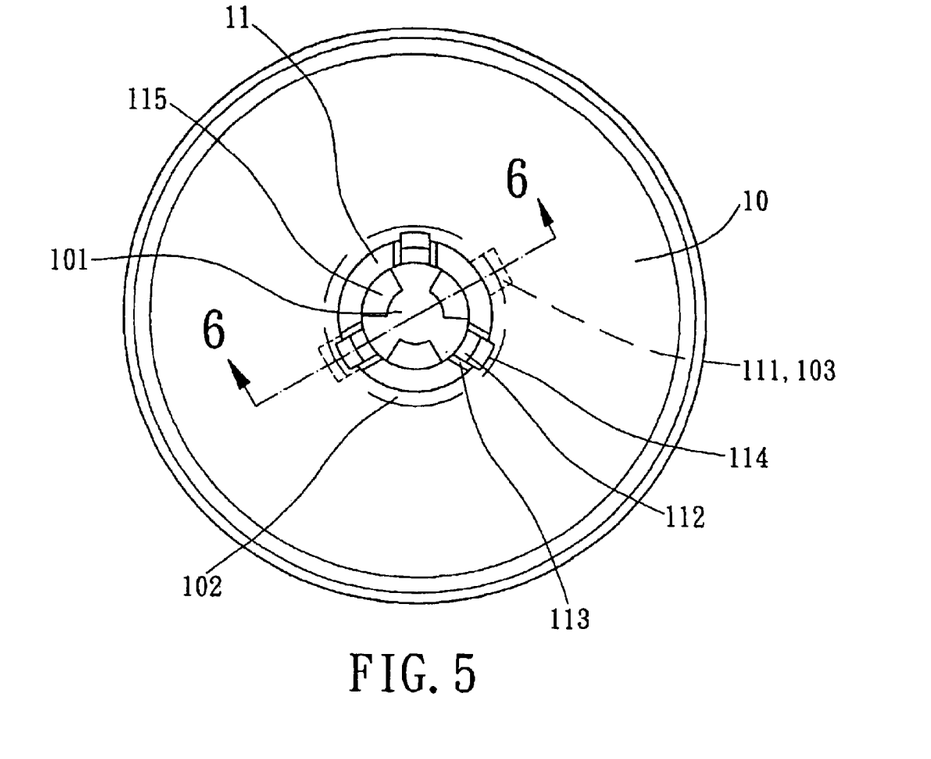
FIG. 5 is a top view of the base and the axle tube of FIG. 4 after assembly.
Figure 6:
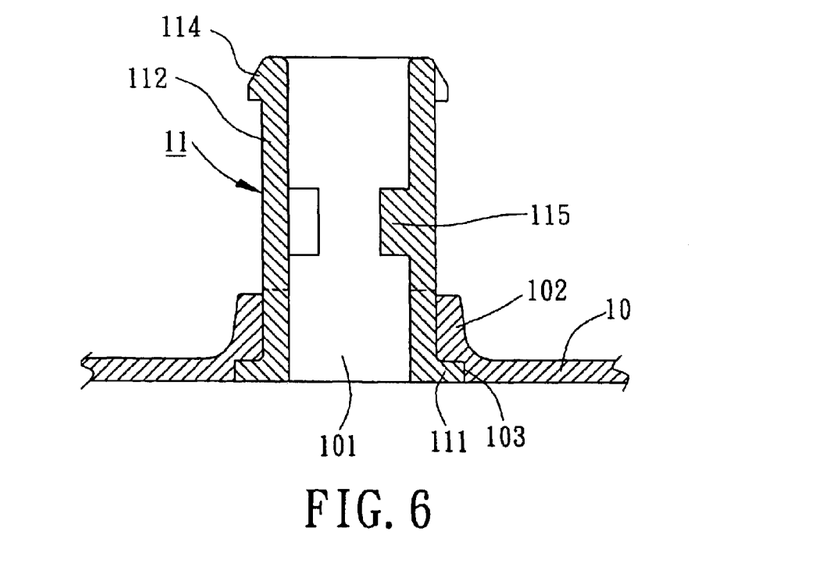
FIG. 6 is a sectional view taken along line 6—6 in FIG. 5.
Figure 7:
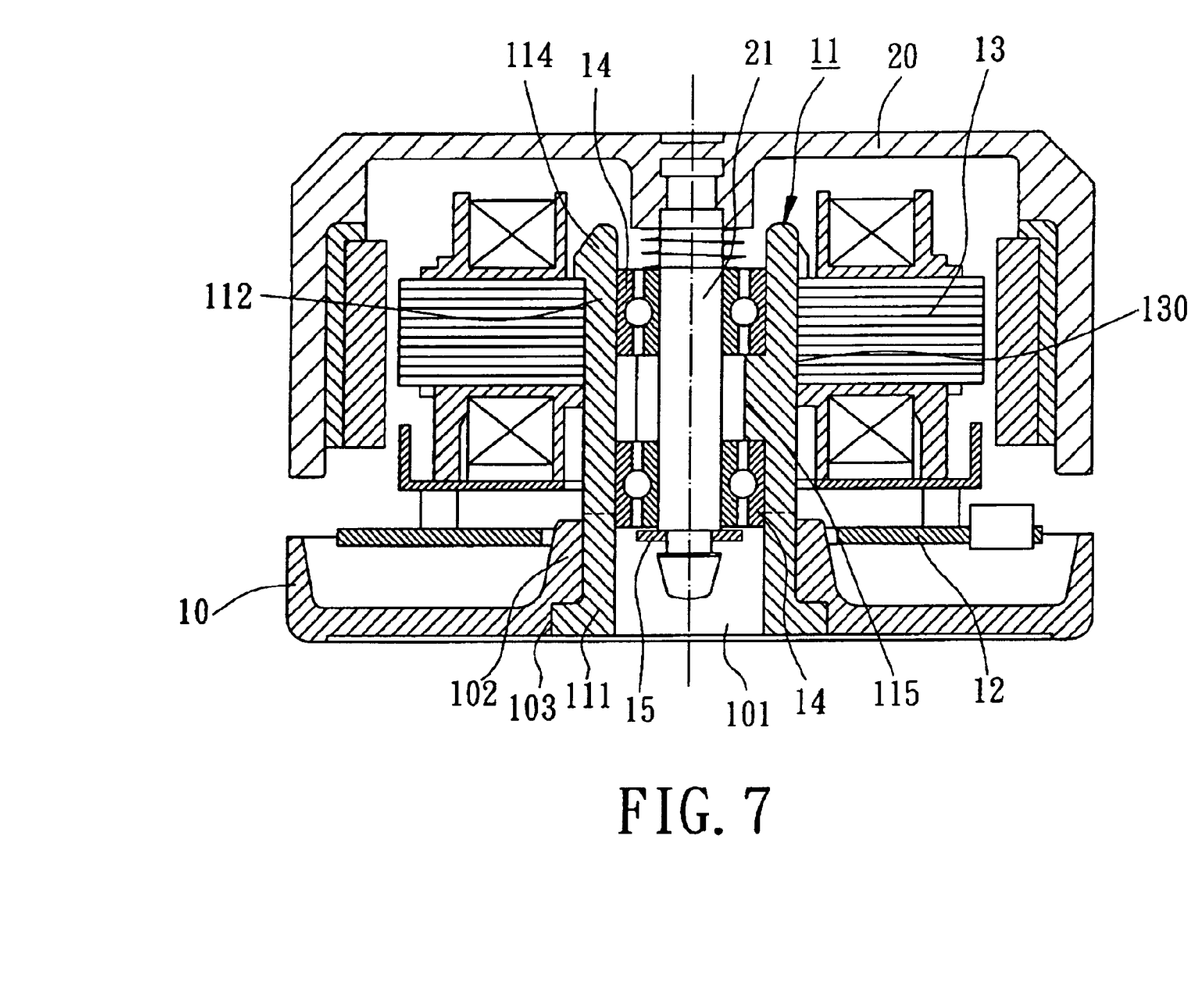
FIG. 7 is a sectional view of a motor using the base and the axle of FIG. 4.

FIG. 4 is an exploded perspective view of a first embodiment of a combination of a base and an axle tube in accordance with the present invention. FIG. 5 is a top view of the base and the axle tube of FIG. 4 after assembly. FIG. 6 is a sectional view taken along line 6—6 in FIG. 5. FIG. 7 is a sectional view of a motor using the base and the axle of FIG. 4.

The first embodiment of the present invention includes a base 10 and an axle tube 11. The base 10 is preferably made of plastics, metal, etc. The base 10 includes an axial hole 101 that is preferably located in a center of the base 10, a flange 102 extending upward from a peripheral edge delimiting the axial hole 101 along a direction parallel to the axial direction of the base 10, and at least one positioning groove 103 defined in a lower portion of an inner periphery of the flange 102. The axle tube 11 is preferably made of a resilient material such as plastics. The axle tube 11 includes at least one positioning protrusion 111 on a lower portion of an outer periphery thereof. Further, the axle tube 11 includes at least one resilient hook rod 112 in a tubular body of the axle tube 11. In this embodiment, there are three resilient rods 112 each of which is formed by means of providing two spaced apart longitudinally slits 113, with a hook 114 formed on a distal portion of each resilient hook rod 112. The hook 114 of each resilient hook rod 112 is normally in a position radially outward of the outer periphery of the axle tube 11 for retaining a stator 13 in place. Further, a plurality of blocks 115 (three in this embodiment) are formed on the inner periphery of the axle tube 11 and located between the resilient hook rods 112.

Referring to FIGS. 6 and 7, in assembly, the lower portion of the outer periphery of the axle tube 11 is securely engaged with the inner periphery of the flange 102, with the protrusion 111 being securely engaged in the positioning groove 103. Thus, the engaging strength between the axle tube 11 and the base 10 is increased, and rotation of the axle tube 11 relative to the base 10 as well as upward movement of the axle tube 11 relative to the base 10 are prevented.

Next, a circuit board 12 and a stator 13 that are previously engaged together are mounted around the outer periphery of the axle tube 11, with a central hole (not labeled) of the circuit board 12 being extended through by the outer periphery of the flange 102 of the base 10 and with the hooks 114 of the resilient hook rods 112 abutting against an upper end face of the stator 13. In this case, an inner periphery delimiting a central hole 130 of the stator 13 is supported by the resilience of the resilient hook rods 12. Next, two bearings 14 (preferably ball bearings) are forcibly inserted into the axle tube 11 until the bearings 14 are respectively located on upper and lower sides of the blocks 115. The bearings 14 exert a radially outward force to the axle tube 11 and the resilient hook rods 112. Thus, reliable positioning for the stator 13 outside the axle tube 11 and for the bearings 14 inside the axle tube 11 is obtained. A shaft 21 of a rotor 20 is rotatably extended through the bearings 14, and a retainer 15 (e.g., a C-clip) is mounted to a distal end of the shaft 21 to thereby prevent upward movement of the rotor 20 when the shaft 21 turns. Thus, the shaft 21 is prevented from being disengaged from the bearings 14 and the axle tube 11.

As illustrated in FIGS. 4 through 7, the combination of the base 10 and the axle tube 11 of the first embodiment of the present invention not only prevents rotation of the axle tube 11 relative to the base 10 as well as upward movement of the axle tube 11 relative to the base 10 through the use of the protrusion 111 and the positioning groove 103 but also reliably retains the stator 13, the bearings 14, and the shaft 21 in place, with the stator 13, the bearings 14, and the shaft 21 being coaxial with one another. Assembly of the stator 13 is more reliable, rotation of the rotor 20 is more stable, noise of the motor resulting from imbalance is avoided, and the life of the motor is prolonged. Further, the base 10 of the same specification can be used with stators 13 of different specifications through replacement of the axle tube 11. Thus, assembly of the motor stator is more flexible.

Figure 8:
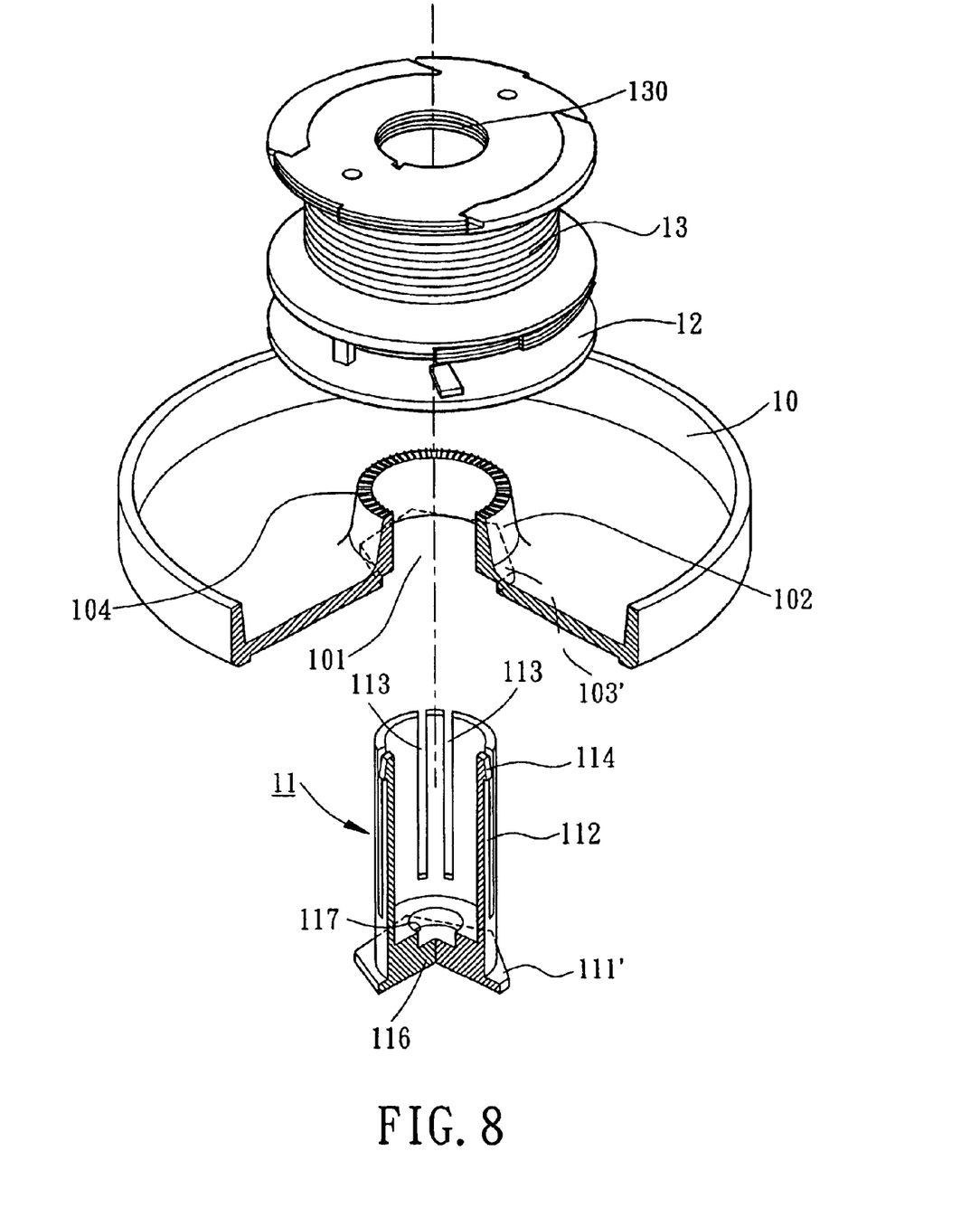
FIG. 8 is an exploded perspective view of a second embodiment of the combination of a base and an axle tube in accordance with the present invention.
Figure 9:
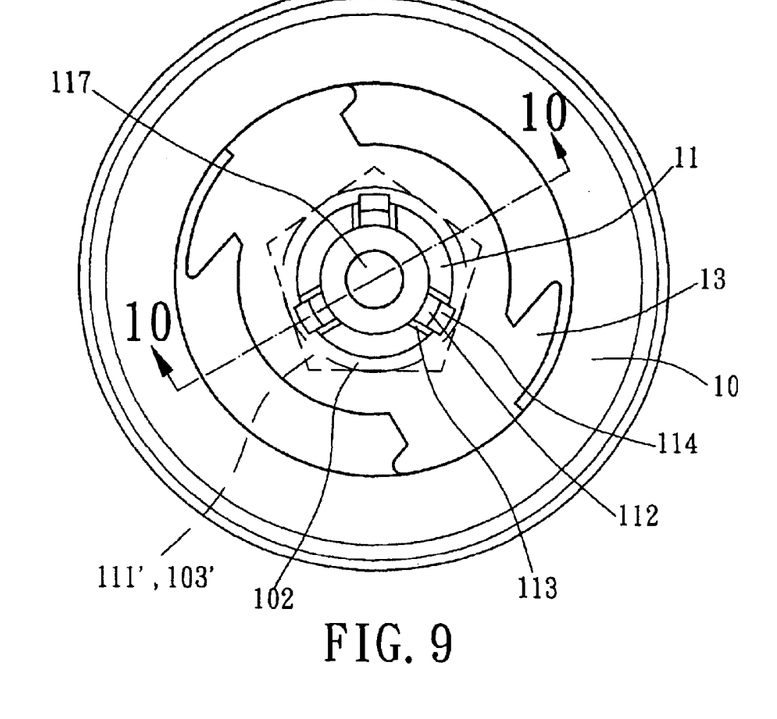
FIG. 9 is a top view of the base and the axle tube of FIG. 4 after assembly.
Figure 10:
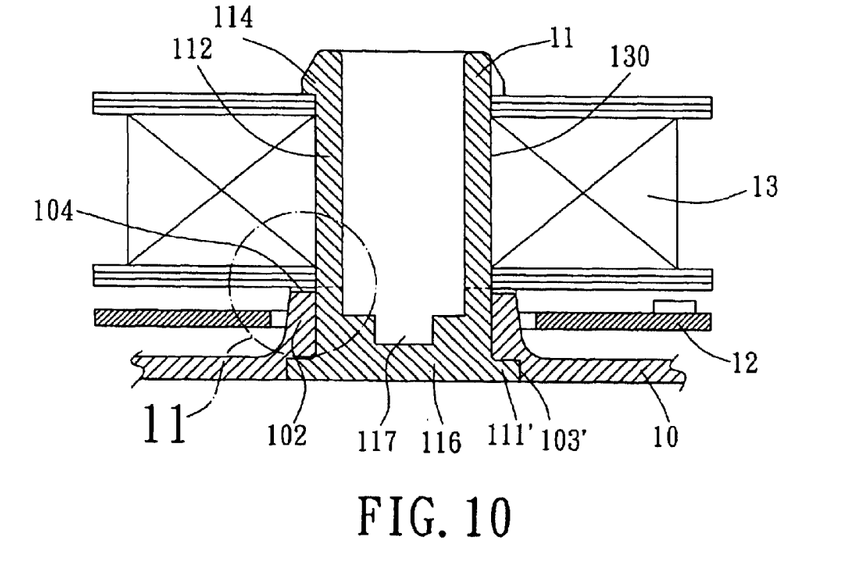
FIG. 10 is a sectional view taken along line 10—10 in FIG. 9.
Figure 11:
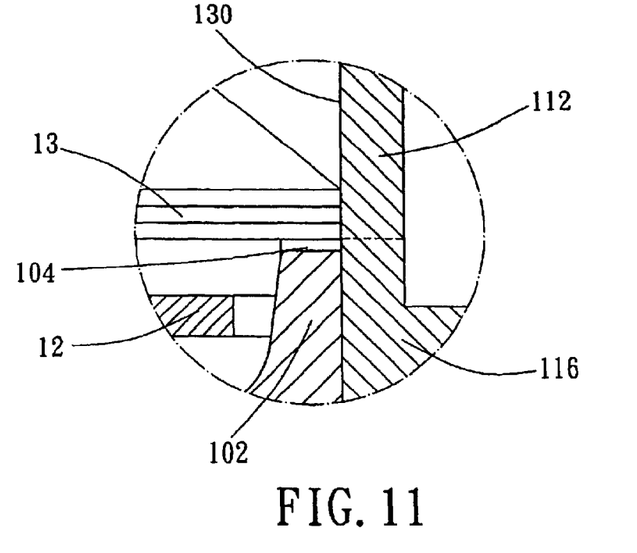
FIG. 11 is an enlarged view of a circled portion in FIG. 10.
Figure 12:
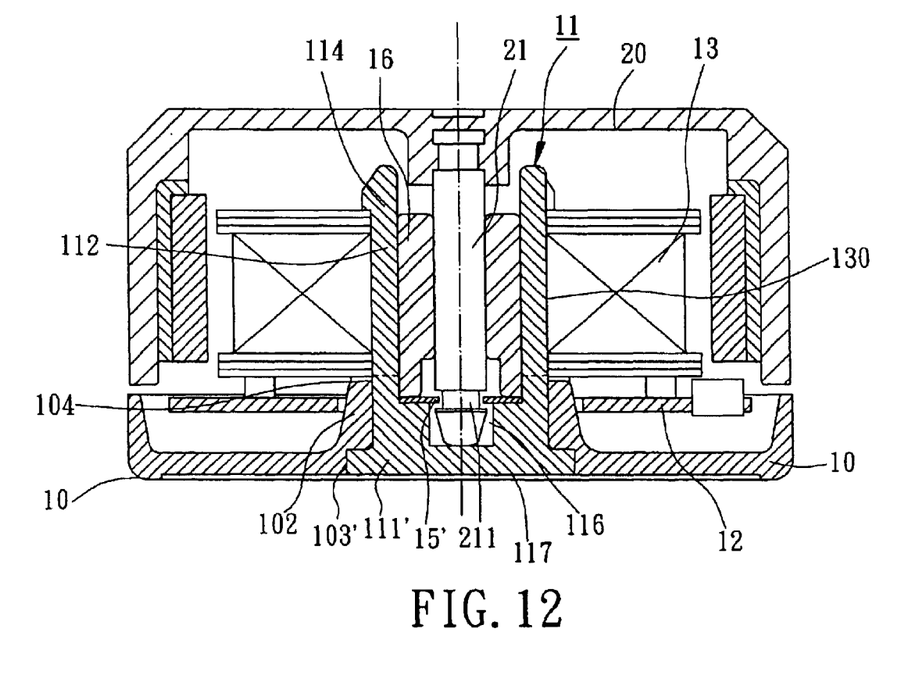
FIG. 12 is a sectional view of a motor using the base and the axle of FIG. 8.

FIG. 8 is an exploded perspective view of a second embodiment of the combination of a base and an axle tube in accordance with the present invention. FIG. 9 is a top view of the base and the axle tube of FIG. 4 after assembly. FIG. 10 is a sectional view taken along line 10—10 in FIG. 9. FIG. 11 is an enlarged view of a circled portion in FIG. 10. FIG. 12 is a sectional view of a motor using the base and the axle of FIG. 8.

In the embodiment of FIGS. 8 through 12, 15, 16, and 17, the base 10 includes a polygonal positioning groove, and the axle tube 11 includes a polygonal protrusion for engaging with the polygonal positioning groove of the base 10. The engaging strength between the base 10 and the axle tube 11 is further improved. The polygonal positioning groove and the polygonal protrusion may include a triangular positioning groove 103a and a triangular protrusion 111a (FIG. 15), a square positioning groove 103b and protrusion 111b (FIG. 16), an elliptic positioning groove and protrusion (see FIGS. 13 and 14), a rectangular positioning groove 103c and protrusion 111c (FIG. 17), a pentagonal positioning groove 103' and protrusion 111' (FIGS. 8–12), etc. Namely, the polygonal positioning groove 103', 103a, 103b, 103c and the polygonal protrusion 111', 111a, 111b, 111c are complimentary to each other in shape. Further, the bottom end of the axle tube 11 is a closed end 116 to form a reservoir 117 for storage of lubricating oil when an oily bearing 16 (FIG. 12) is used. Further, a retainer 15' that prevents upward movement of the shaft 21 of the rotor 20 during rotation of the rotor 20 is securely held between a bottom of the oily bearing 16 and a top end face of the reservoir 117. As illustrated in FIG. 12, the retainer 15' is located in an annular groove 211 in a distal end of the shaft 21 to prevent the shaft 21 from being disengaged from the oily bearing 16 and the axle tube 11. Further, as illustrated in FIGS. 8 and 15–17, a plurality of radially extending ribs 104 or rugged surfaces are provided on a top face of the flange 102 and are thus deformable, as they are made from plastics. When the stator 13 is mounted around the axle tube 11, the ribs 104 deform when subjected to the force from the stator 13, thereby adjusting the position of the hooks 114 of the hook rods 112 to the top face of the flange 102 of the base 10 in the axial direction while assembling the stator 13, and thereby reliably retaining the stator 13 in place by the hooks 114 of the hook rods 112.

Figure 13:
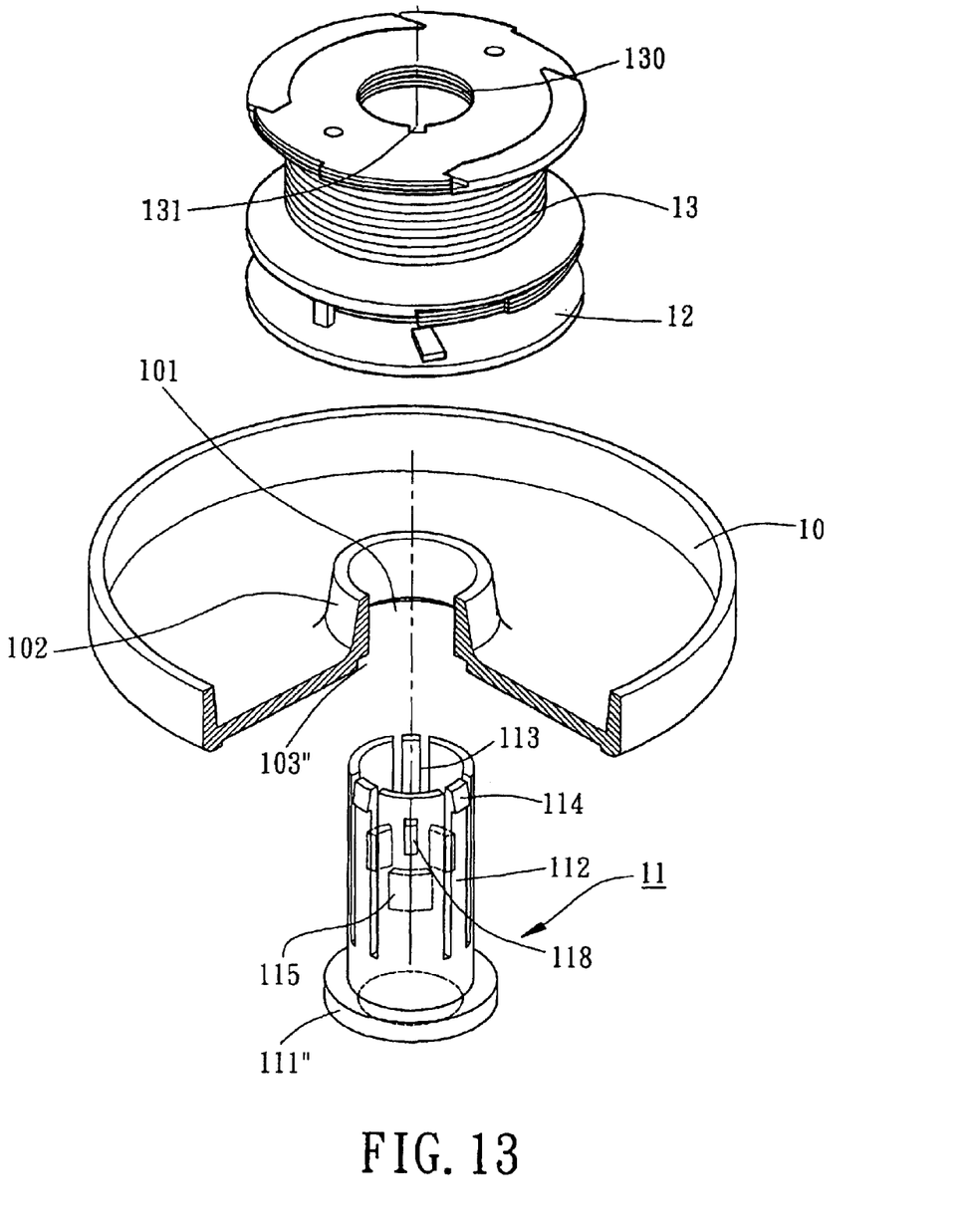
FIG. 13 is an exploded perspective view of a third embodiment of the combination of a base and an axle tube in accordance with the present invention.
Figure 14:
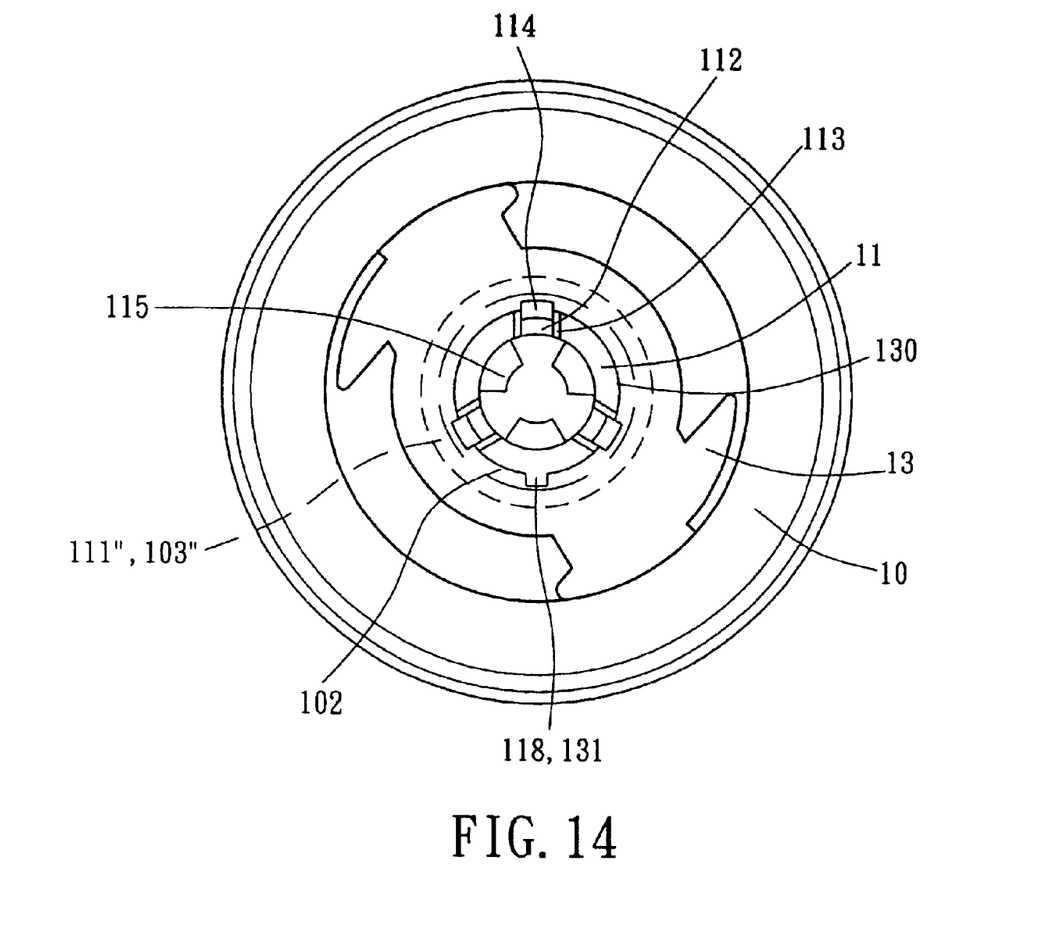
FIG. 14 is a top view of the base and the axle tube of FIG. 13 after assembly.
Figure 15:
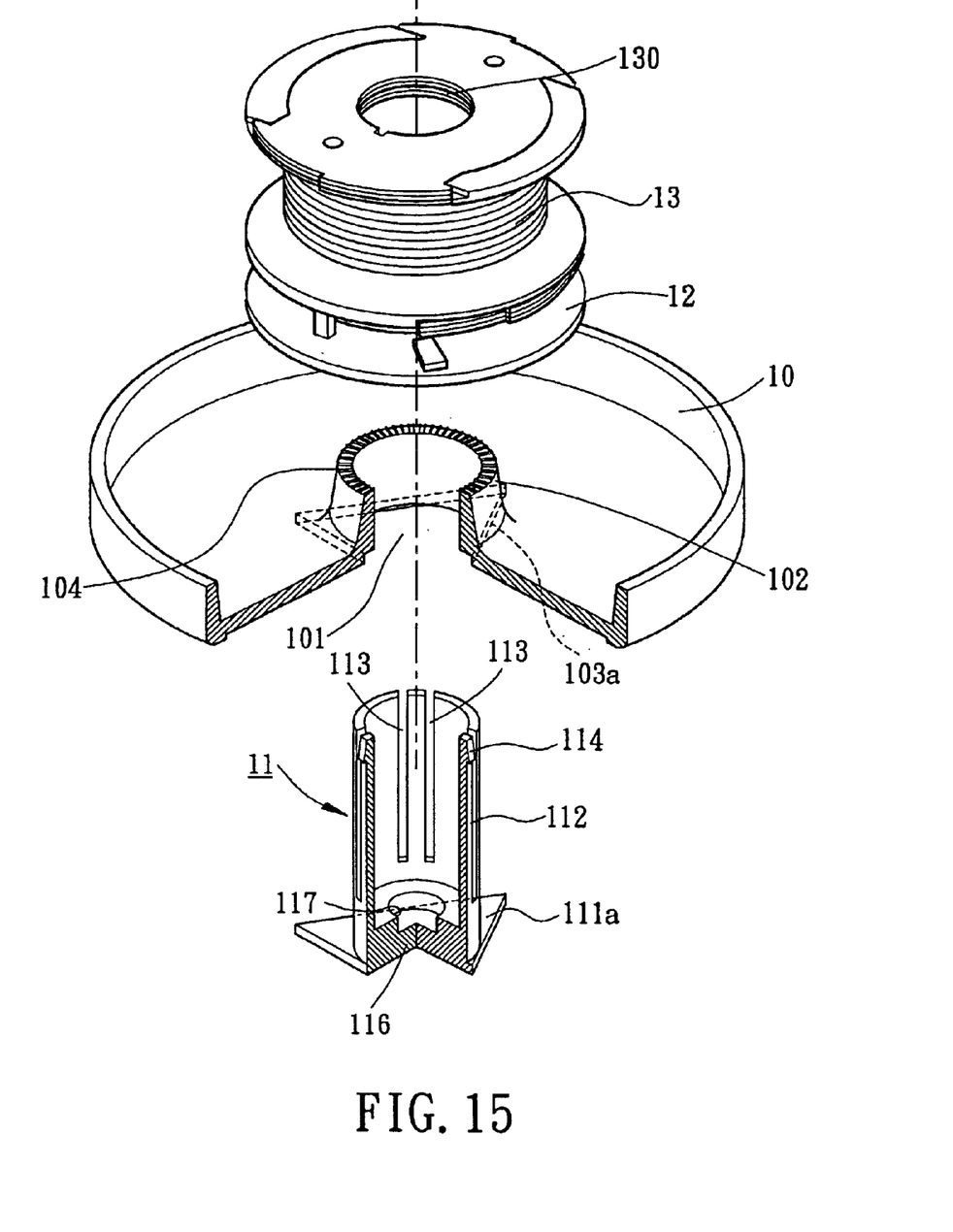
FIGS. 15–17 are exploded perspective views of variations of the second embodiment of the combination of a base and an axle tube in accordance with the present invention.
Figure 16:
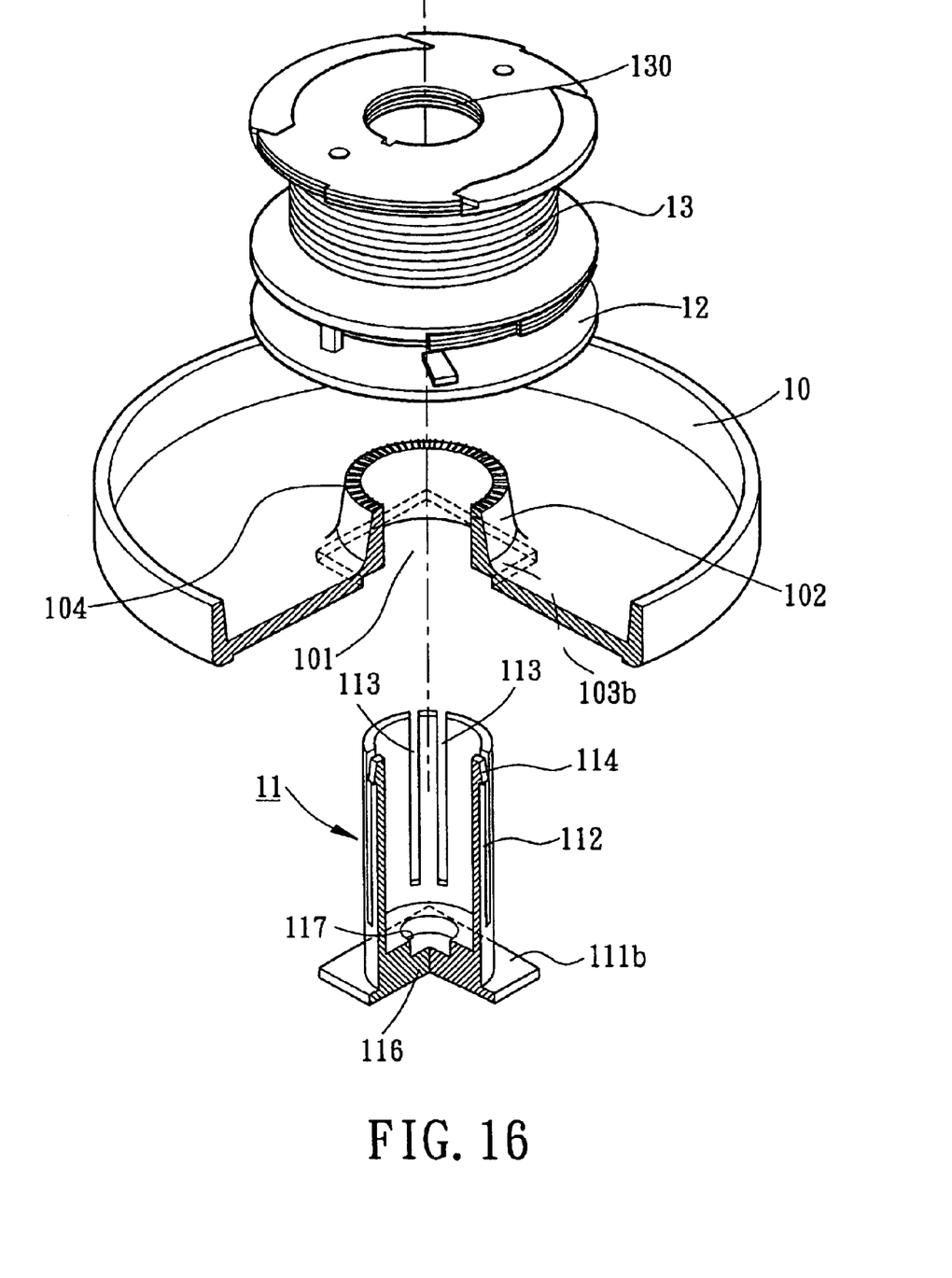
Figure 17:
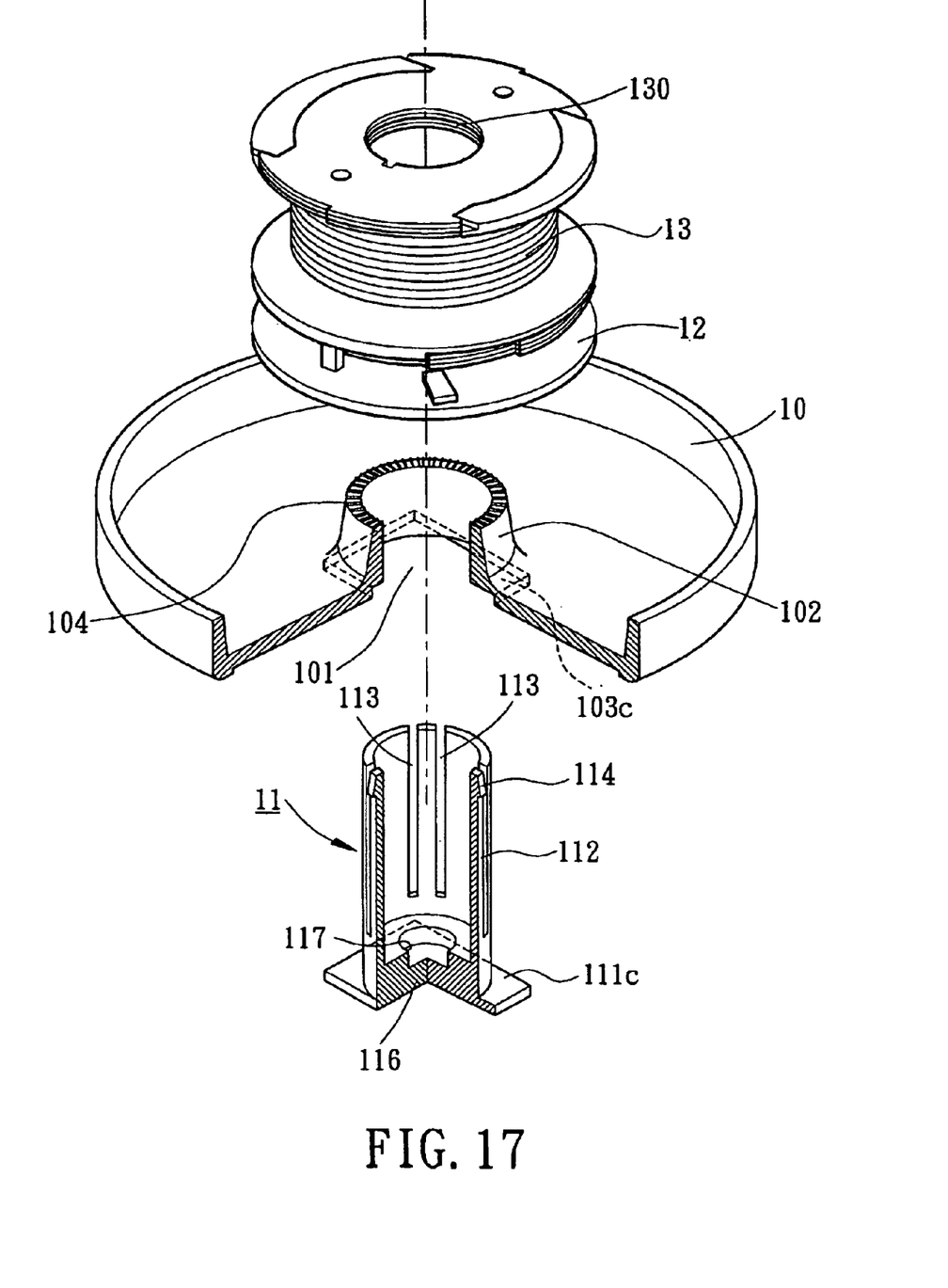

FIG. 13 is an exploded perspective view of a third embodiment of the combination of a base and an axle tube in accordance with the present invention. FIG. 14 is a top view of the base and the axle tube of FIG. 13 after assembly.

In the embodiment shown in FIGS. 13 and 14, the base 10 includes an elliptic positioning groove 103", and the axle tube 11 includes an elliptic protrusion 111" for engaging with the elliptic positioning groove 103" of the base 10. The engaging strength between the base 10 and the axle tube 11 is further improved. Further, the axle tube 11 includes a strip 118 on the inner periphery thereof, and the stator 13 includes a groove 131 on the inner periphery of the central hole 130 for engaging with the strip 118. When the stator 13 is retained by the hooks 114 of the resilient hook rods 112 to the outer periphery of the axle tube 11, the strip 118 of the axle tube 11 engages with the groove 131 of the stator 13 to further avoid rotation of the axle tube 11 relative to the stator 13.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A combination of a base and an axle tube for a motor, the combination comprising:
    a base including an axial hole, and a flange extending upward from a peripheral edge delimiting the axial hole, the flange having an inner periphery, at least one positioning groove being defined in a lower portion of the inner periphery of the flange; and
    an axle tube including a tubular body and at least one protrusion on a lower portion of an outer periphery of the axle tube, the axle tube being extended through the axial hole of the base, with the lower portion of the outer periphery of the axle tube being engaged with the lower portion of the inner periphery of the axial hole of the base and with said at least one protrusion of the axle tube being engaged with said at least one positioning groove of the base, at least one resilient hook rod being formed in the tubular body of the axle tube and having a hook for securely retaining a stator around the axle tube and for securely retaining at least one bearing in the axle tube,
    wherein the tubular body of the axle tube has two longitudinally extending slits respectively on two sides of said at least one resilient hook rod.

2. The combination of a base and an axle tube for a motor as claimed in claim 1, wherein the axle tube is made from a resilient material.

3. The combination of a base and an axle tube for a motor as claimed in claim 1, wherein the number of said at least one resilient hook rod is more than two, and wherein a block is formed on the inner periphery of the axle tube and located between the resilient hook rods, with two bearings mounted in the axle tube respectively abutting against an upper side and a lower side of the block.

4. The combination of a base and an axle tube for a motor as claimed in claim 1, wherein the axle tube includes a closed lower end.

5. The combination of a base and an axle tube for a motor as claimed in claim 4, wherein the closed lower end of the axle tube forms a reservoir for storage of lubricating oil.

6. The combination of a base and an axle tube for a motor as claimed in claim 5, further including an oily bearing mounted in the axle tube, a retainer being clamped between a bottom of the oily bearing and a top end face of the reservoir.

7. The combination of a base and an axle tube for a motor as claimed in claim 1, wherein the flange of the base includes a plurality of radially extending ribs on a top face thereof.

8. A combination of a base and an axle tube for a motor, the combination comprising:
    a base including an axial hole, and a flange extending upward from a peripheral edge delimiting the axial hole, the flange having an inner periphery, at least one positioning groove being defined in a lower portion of the inner periphery of the flange; and
    an axle tube including a tubular body and at least one protrusion on a lower portion of an outer periphery of the axle tube, the axle tube being extended through the axial hole of the base, with the lower portion of the outer periphery of the axle tube being engaged with the lower portion of the inner periphery of the axial hole of the base and with said at least one protrusion of the axle tube being engaged with said at least one positioning groove of the base, at least one resilient hook rod being formed in the tubular body of the axle tube and having a hook for securely retaining a stator around the axle tube and for securely retaining at least one bearing in the axle tube,
    wherein said at least one protrusion of the axle tube is polygonal, and wherein said at least one positioning groove of the base is configured complimentary to said at least one protrusion of the axle tube.

9. The combination of a base and an axle tube for a motor as claimed in claim 8, wherein said at least one protrusion of the axle tube is one of elliptic triangular, square, rectangular, and pentagonal.

10. A combination of a base and an axle tube for a motor, the combination comprising:
    a base including an axial hole, and a flange extending upward from a peripheral edge delimiting the axial hole, the flange having an inner periphery, at least one positioning groove being defined in a lower portion of the inner periphery of the flange; and
    an axle tube including a tubular body and at least one protrusion on a lower portion of an outer periphery of the axle tube, the axle tube being extended through the axial hole of the base, with the lower portion of the outer periphery of the axle tube being engaged with the lower portion of the inner periphery of the axial hole of the base and with said at least one protrusion of the axle tube being engaged with said at least one positioning groove of the base, at least one resilient hook rod being formed in the tubular body of the axle tube and having a hook for securely retaining a stator around the axle tube and for securely retaining at least one bearing in the axle tube, wherein the axle tube has a strip on the outer periphery thereof, and wherein the stator includes a central hole having a groove on an inner periphery delimiting the central hole of the stator, the strip of the axle tube being engaged in the groove of the stator when the stator is mounted to the axle tube.

* * * * *